United States Patent [19]

Pfeiffer

[11] Patent Number: 4,466,857

[45] Date of Patent: Aug. 21, 1984

[54] CONTINUOUSLY OPERATING PRESS FOR THE PRODUCTION OF PARTICLE BOARD, FIBERBOARD, PLYWOOD SHEETS OR THE LIKE

[75] Inventor: Heinrich Pfeiffer, Eppingen, Fed. Rep. of Germany

[73] Assignee: Maschinenfabrik J. Dieffenbacher GmbH & Co., Eppingen, Fed. Rep. of Germany

[21] Appl. No.: 286,315

[22] Filed: Jul. 24, 1981

[30] Foreign Application Priority Data

Jul. 24, 1980 [DE] Fed. Rep. of Germany ....... 3028145

[51] Int. Cl.[3] .......................... B30B 5/02; B31F 5/00; B23K 27/00; B32B 31/00

[52] U.S. Cl. .............................. 156/583.5; 156/583.1; 156/555; 156/580; 100/151; 198/627

[58] Field of Search ............... 156/583.5, 583.3, 583.1, 156/580, 555; 100/151, 154; 198/627

[56] References Cited

U.S. PATENT DOCUMENTS

| | | | |
|---|---|---|---|
| 2,046,047 | 6/1936 | Watkins | 156/580 X |
| 3,367,261 | 2/1968 | Kashiwagi | 156/583.5 X |
| 3,985,489 | 10/1976 | de Mets | 425/143 |
| 3,993,426 | 11/1976 | Ahrweiler et al. | 156/583.5 X |

FOREIGN PATENT DOCUMENTS

| | | | |
|---|---|---|---|
| 176349 | 10/1953 | Fed. Rep. of Germany | 100/154 |
| 2403209 | 7/1975 | Fed. Rep. of Germany | 425/143 |
| 1316745 | 5/1973 | United Kingdom | 100/154 |

*Primary Examiner*—Edward C. Kimlin
*Assistant Examiner*—Merrell Cashion
*Attorney, Agent, or Firm*—Schwartz, Jeffery, Schwaab, Mack, Blumenthal & Koch

[57] ABSTRACT

The press includes a press table, a tup mounted with respect to the press table to define a press gap for receiving material to be pressed. An endless conveyor band is disposed around each of the table and the tup for conveying the material to be pressed into the press gap. Each conveyor band is mounted by a plurality of rolls. The rolls are mounted to counter supports which comprise a plurality of change plates. The change plates contain roll bearings which mount the rolls. The change plates also contain a heating apparatus and cooling apparatus and are capable of being mounted to and removed from the table and the tup. Each change plate comprises at least one rod mounted on a first level through a roll bearing and through a web plate. Each web plate is attached on a second level to a pressure plate through a connecting rod. In this manner, the counter pressure of the material being pressed is transferred to the pressure plates and can be distributed over a wider area.

8 Claims, 8 Drawing Figures

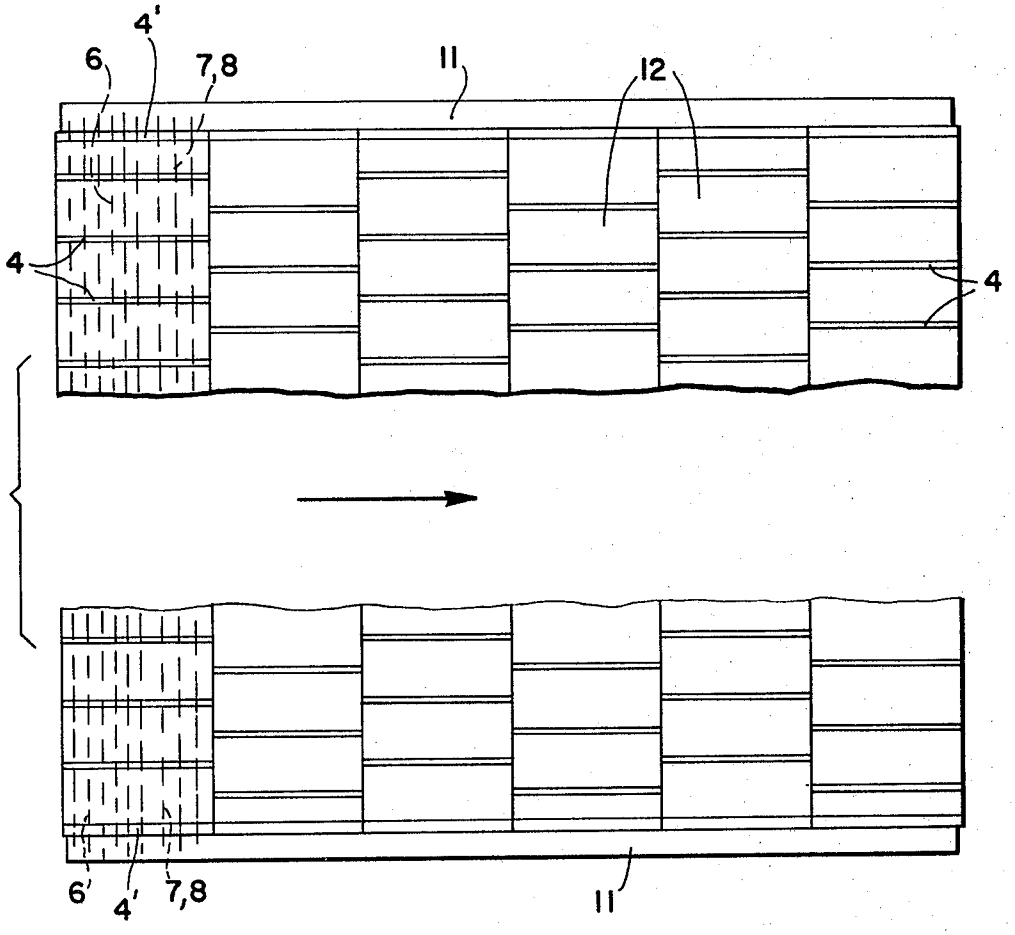
F/G.5

CONTINUOUSLY OPERATING PRESS FOR THE PRODUCTION OF PARTICLE BOARD, FIBERBOARD, PLYWOOD SHEETS OR THE LIKE

BACKGROUND OF THE INVENTION

1. Field of the Invention

The present invention relates to a continuously operating press for the production of particle board, fiberboard, plywood sheets and the like.

2. Discussion of Related Art

In the production of particle board, fiberboard, synthetic plastic and laminate sheets, the vulcanizing of conveyor bands, plywood sheets and the like, it is necessary to expose the material to be pressed to high pressures and temperatures, if the required quality is to be attained. The known, intermittently operating single level hot plate presses do satisfy these requirements, but their output is relatively low. Known continuously operating presses such as those disclosed in German Offenlegungsschrift No. 28 53 285 and German Patentschrift No. 198131 are intended to eliminate this disadvantage. They have the further advantage, for example, in the production of particle board that the finished product is an endless plate, which is desirable to produce uniform quality and favorable cutting proportions. In order to reduce friction between the steel bands and the table and the press tup serving as the support, the sliding surfaces facing the steel bands are composed of small rolls. It is necessary, however, to support each roll carpet over the width of the band by means of roll bodies serving as counter bearings. Otherwise the support rods would bend out of shape and the pressed surface would become uneven.

Another disadvantage of known continuously operating presses is that the supports are not only costly but that they also provide an excessively complex structure susceptible to failure. Furthermore, such a layout results in a large number of inaccessible support locations which, when damaged, lead to the shutdown of the press or even of the entire installation.

Still further, the abovementioned designs for continuously operating presses are poorly suited to effect an adequate transfer of heat to the steel bands and thus to the material being pressed, because the spaces wherein the roll and the roll bodies are arranged, act as insulators between the press table and the tup on the one hand and the steel bands on the other.

SUMMARY OF THE INVENTION

It is the object of the invention recited in claim 1 to provide a continuously operating press of the abovedescribed type, having supports of a simple, accurate and failure resistant design, permitting the rapid and convenient repair of defects and damage in the supports and making possible favorable heat transfer to the steel bands.

The press according to the invention has the following advantages in view of the abovedescribed state of the art:

(a) All of the structural parts are simple in design and may therefore be manufactured inexpensively, while the rolls may consist of commercially available bearings (depending on the application of the press, they may be ball bearings, roller bearings, needle bearings, simple steel or synthetic plastic rolls with bushings; all of them made with sealing lips, possibly without inner rings).

(b) The individual parts of the change plate and the plate itself may be replaced rapidly and easily by keeping an adequate supply in stock. Repair and maintenance shutdowns are therefore short.

(c) The heating apparatus assures the satisfactory transfer of heat through the steel bands into the material being pressed, by means of either the direct or indirect heating of the rolls.

(d) The structure of the change plate overall results in an accurate bearing and support of the rolls and the steel bands, which in turn assures a long life of the rolls and the steel bands.

(e) The design of the change plate further makes it possible to use extremely small rollers or rolls of a very small diameter. Small rolls of this type also reduce the distance between successive rows of rolls and in practice result in the application of an almost uniform pressure to the steel bands. This leads again to a longer life of the steel bands.

With the press according to the invention, increased pressure may be transferred to the material being pressed, while maintaining a good transfer of heat. Because of the higher pressure, the length of the press may be increased and the throughput velocity raised in a similar manner. As the result, the output of a single level hot plate press is exceeded quantitatively (amount of pressed material produced per unit time).

BRIEF DESCRIPTION OF THE DRAWINGS

A preferred form of the press according to the present invention is shown schematically in the drawings and shall be described in more detail hereinafter:

In the drawings, like reference numerals represent like parts throughout and:

FIG. 5 shows the arrangement of the change plates without steel bands on the press table.

DETAILED DESCRIPTION OF THE PREFERRED EMBODIMENTS

Figure 1:
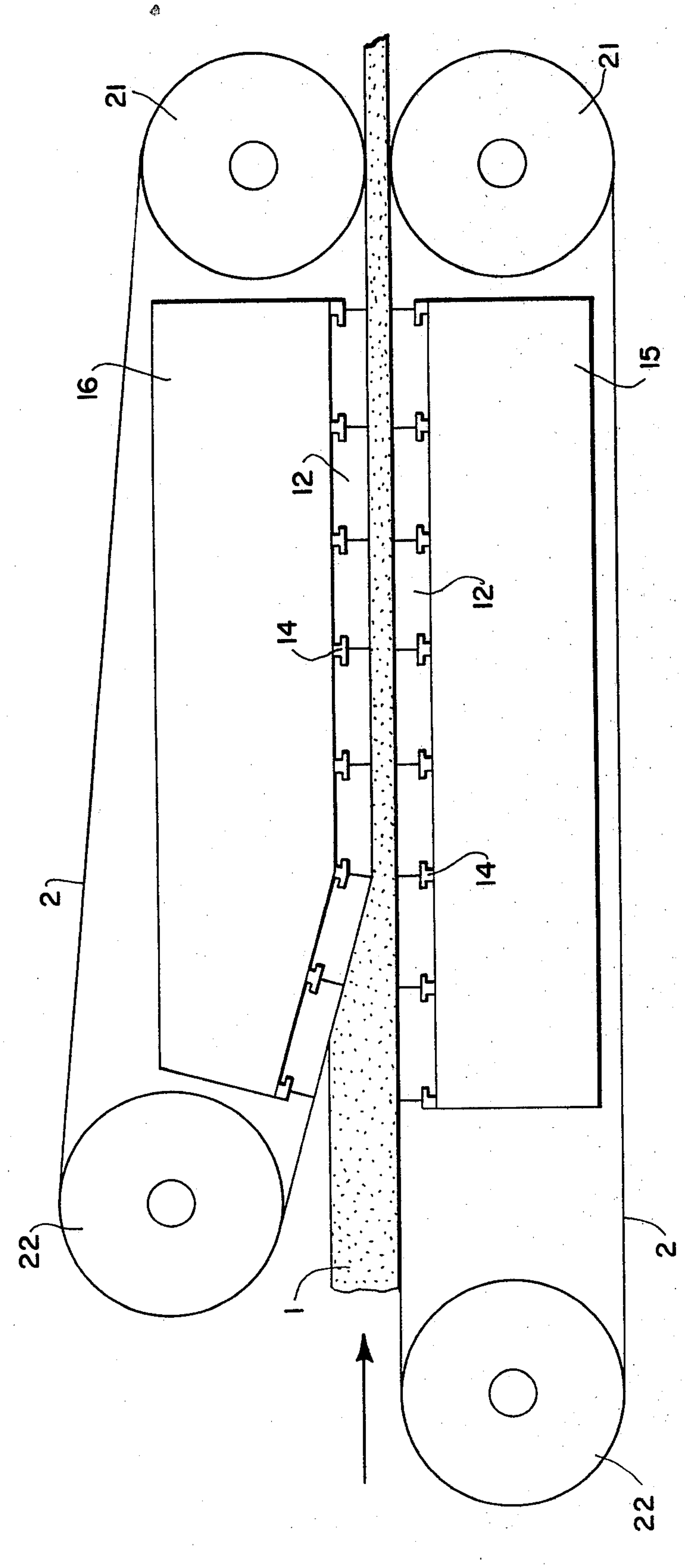
FIG. 1 shows a continuously operating press according to the present invention in a lateral elevation, FIGS. 2 and 2' show change plates for use in the press of FIG. 1 in a cross section B—B of FIGS. 3 and 3' taken transversely to the throughput direction, FIGS. 3 and 3' show change plates for use FIG. 1 in a section A—A of FIGS. 2 and 2' taken longitudinally to the throughput direction, FIGS. 4 and 4' show a section through the distributor plate according to FIG. 1.

According to FIGS. 1 to 5, the press consists of a press table 15, the moving press tup 16 and the tie columns (not shown) connecting the two. To set the press gap (not shown) the tup 16 is moved up and down by means of hydraulic cylinders (not shown) and stopped in the position selected. The steel bands 2 are each guided by means of a drive roll 21 and a reversing roll 22, around the press table 15 and the tup 16, respectively.

According to the invention, the counter supports of the press table 15 and the tup 16 consist of change plates 12, which may be mounted and removed. The change plates 12 (FIGS. 2' and 3') support both the bearings for the rolls 3 and the installation for the heating and cooling system. The structural design of the roll supports is based on the concept that the counter pressure from the material 1 being pressed is transferred by the rolls 3 by means of web plates 4 and 4' with a high specific pressure, and by the pressure plates 5 to the mounting plate 10 with a low specific pressure. This is intended to protect the insulating plate 9 provided between the pressure plate 5 and the mounting plate 10. The function of the insulating plate is to prevent the radiation of heat for the press table 15 and the tup 16. In its simplest form, the layout of a change plate 12 consists of a plurality of pressure plates 5 and web plates 4 and 4', which are threaded alternatingly onto the rods 7 and the tie bars 8, wherein the tie bars 8 maintain the parts together under pre-stress. Subsequently, in the first level, by means of the insertion of the rods 6 in the bores provided in the web plates 4, 4', the rolls 3' may be threaded onto the rods 6. The rods 6 and 7 are secured by means of nuts 18 to the two outer web plates 4'. This structural assembly is then mounted by means of several screws 13, with the insertion of the insulating plate 9, onto the mounting plate 10. The change plates 12 are now fastened by inserting them onto splines on the press table 15 and the press tup 16, by the mounting slots 14. By making the mounting slots 14 sufficiently large, this arrangement provides an adjustable keying of the change plates 12 on the longitudinal sides of the press. It is obvious that thereby the running of the steel bands 2 and their control may also be effected.

The heating apparatus according to the invention consist of the fact that the rods 6 and 7 are tubular in their configuration and that on both of the longitudinal sides of the press, two or more distributor plates 11 (FIG. 4') with heating and/or cooling conduits 17, are fastened to the outer web plates 4' by means of screws 19. By means of a suitable medium, pumped through the conduits 17 into the tubes 6 and 7, the rolls 3 and thus the steel bands may be directly heated or cooled. Indirect heating of the rolls 3, when extremely small rolls 3' with very small diameters are required, may be effected by making the pressure plates 5, the distributor plates 11, the web plates 4 and 4', the rods 6 and possibly the tubes 7, out of a highly heat conductive material, such as copper, bronze, brass, aluminum or the like. To facilitate the mounting and removal of the distributor plates 11, they are joined to the tubes 6' and 7 and the web plates 4' by means of seals 20.

According to FIG. 5, an appropriate arrangement of the change plates 12 on the press table 15 and the tup 16 consists of making the web plates 4 of two adjacent change plates 12 offset with respect to each other, in the running direction of the steel bands 2.

To further increase the compressive force by rising the tensile force whereby the material 1 to be pressed is drawn through the press gap, between the counter supports consisting of the change plates 12 of the press table 15 and the tup 16, and the steel bands 2, an endless slat conveyor band or chain conveyor may be run, possibly over additional reversing and drive rolls.

For ease of manufacture, the change plate 12 may be made without the insulating plate 9 and the mounting plate 10. Insulation will then be applied to the press table 15 and the tup 16, while the mounting grooves are machined into the pressure plate 5.

Figure 2:
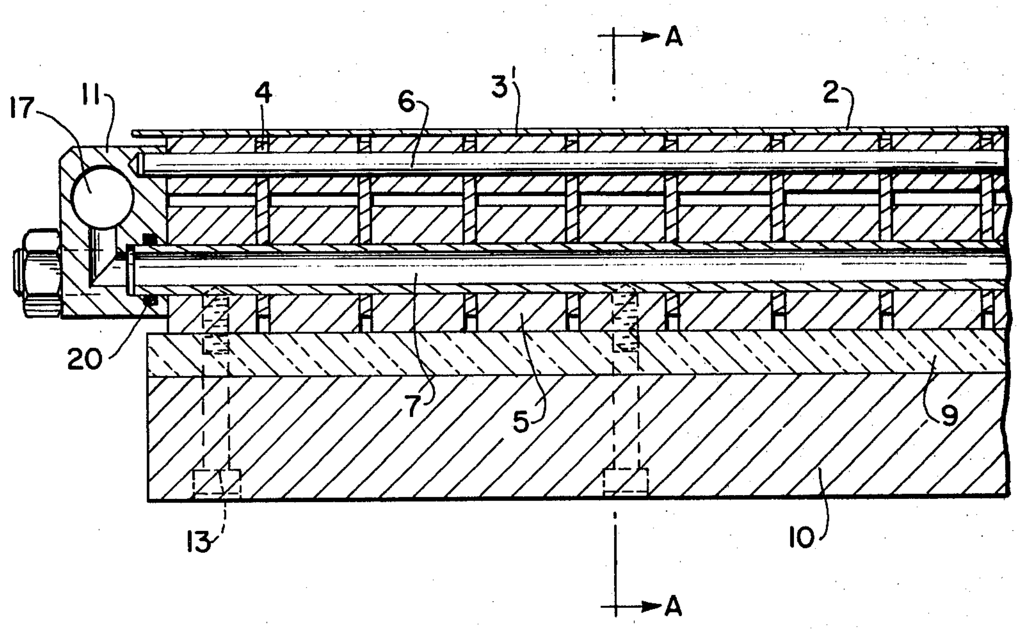
Figure 3:
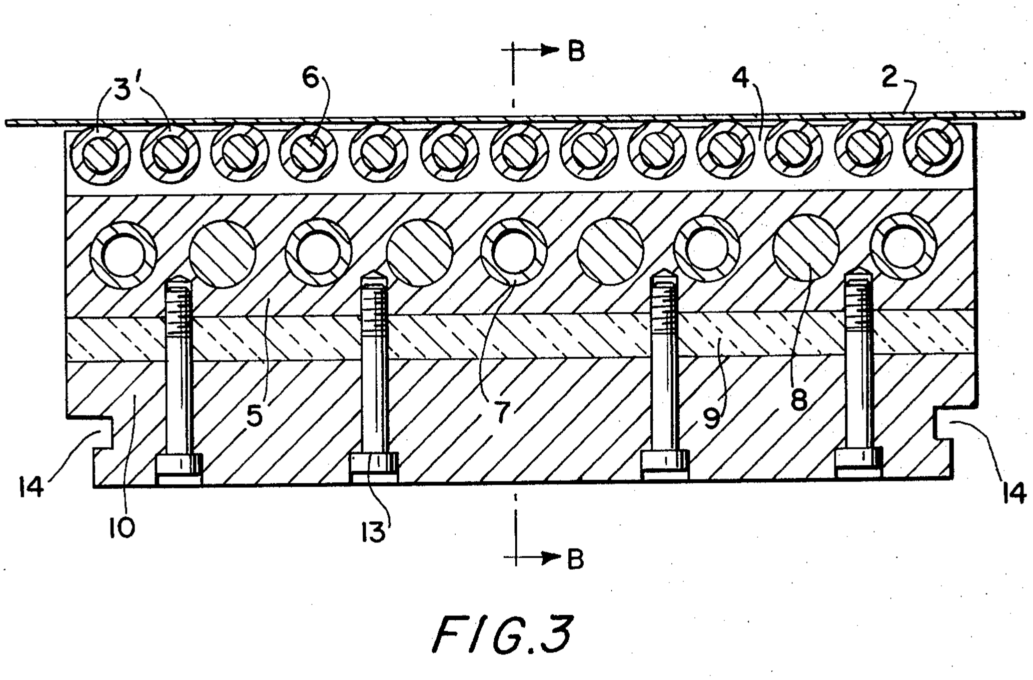
Figure 2:
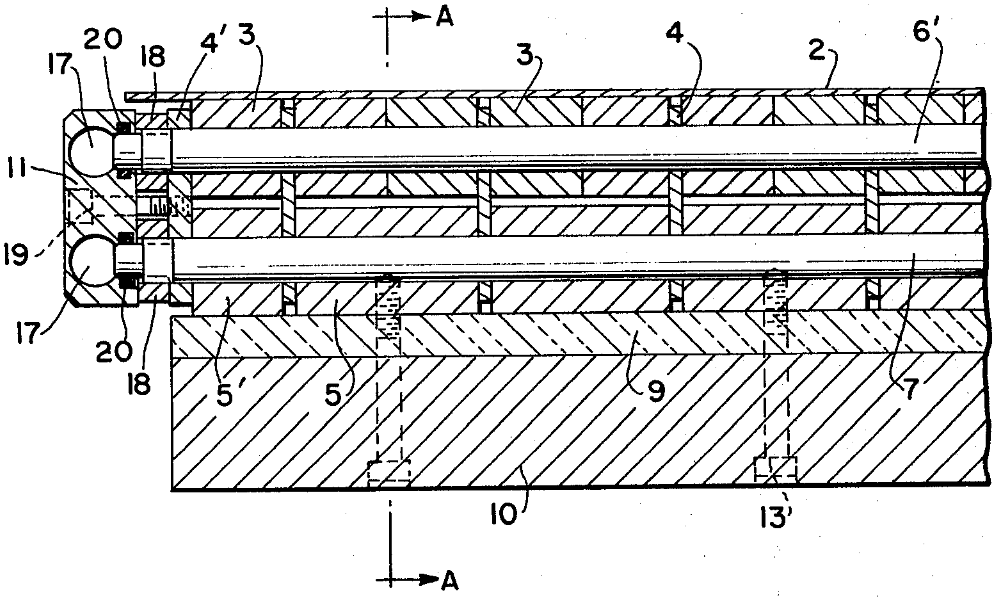
Figure 3:
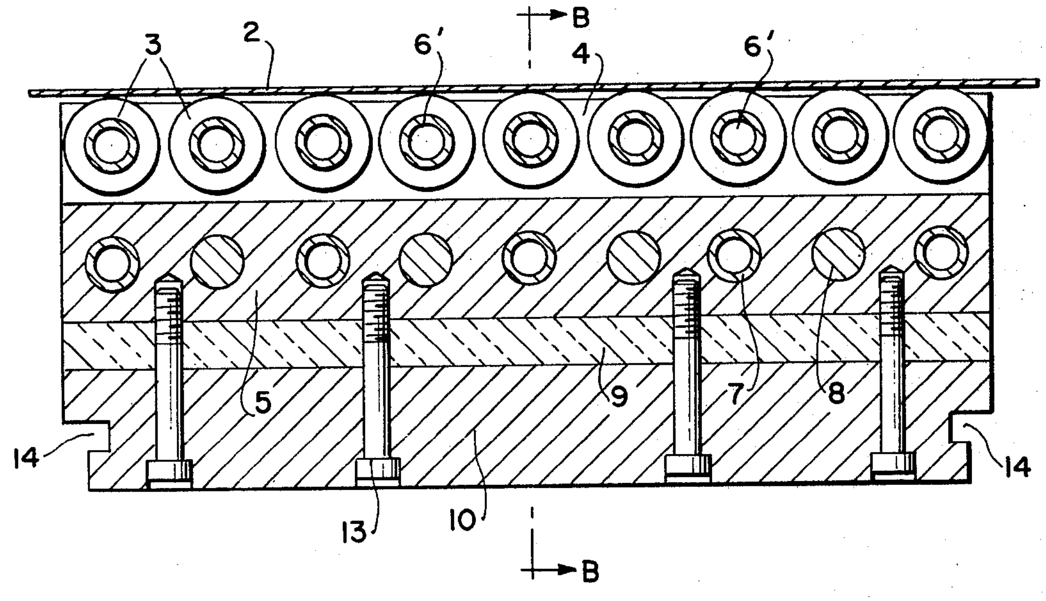
Figure 4:
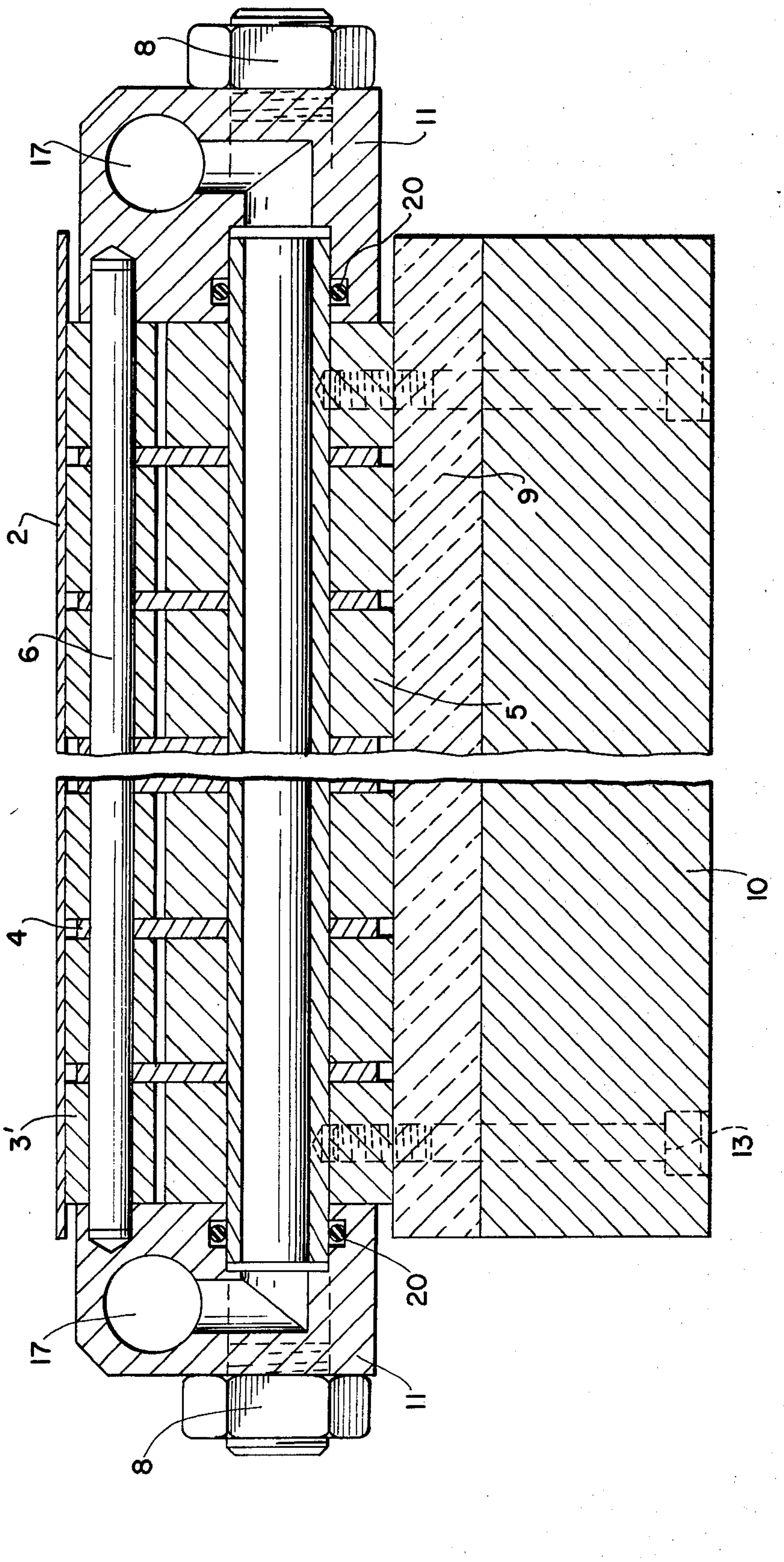
Figure 4:
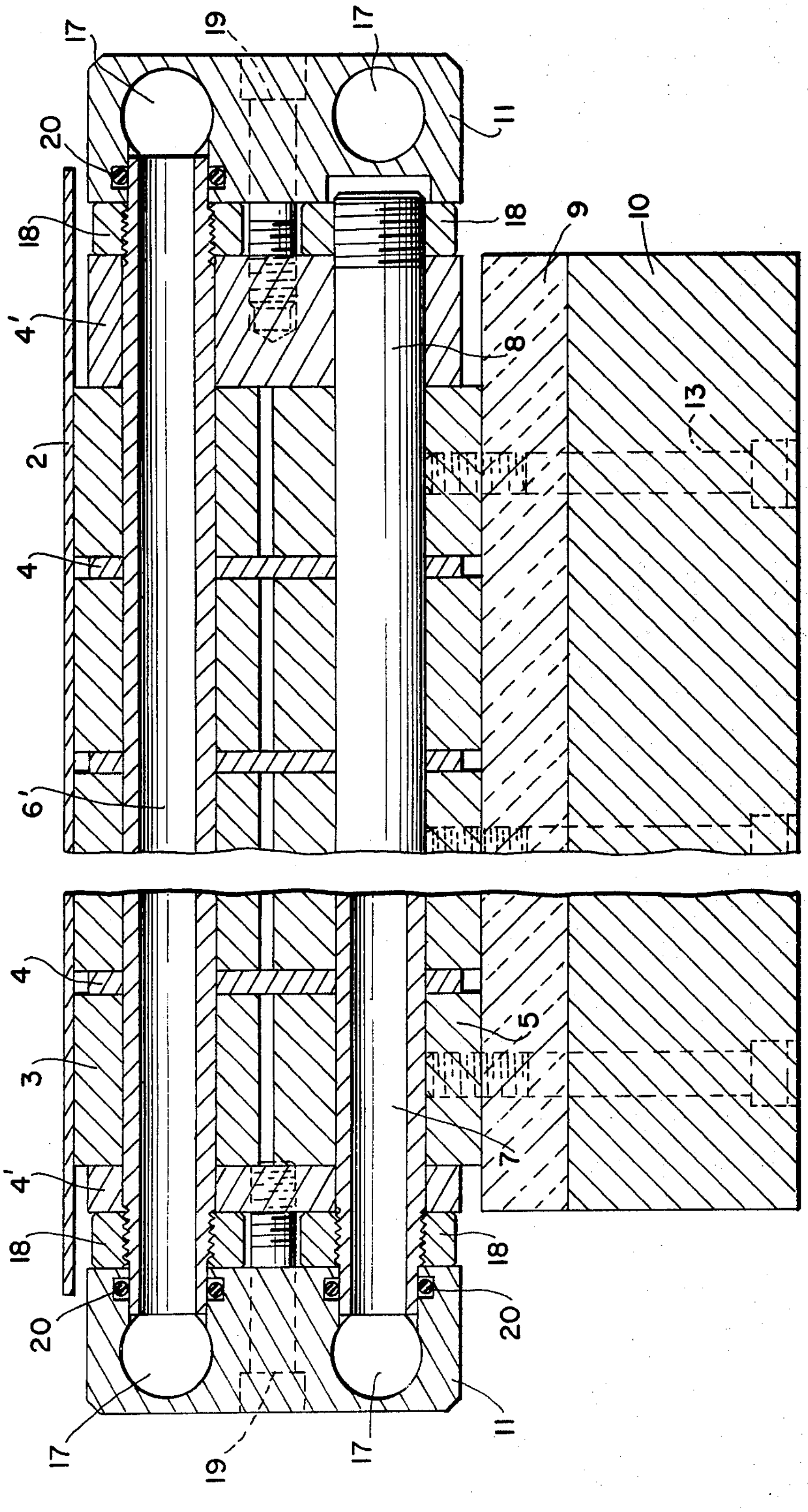

FIGS. 2 to 4 show, in contrast to FIG. 2' to 4', an assembly of the change plates 12 without the closing web plates 4'.

I claim:

1. A continuously operating press for the production of particle board, fiberboard, plywood or the like, comprising:

a press table;

a tup adjustably mounted with respect to said press table to define a press gap for receiving material to be pressed;

a first conveyor band disposed around said press table;

a second conveyor band disposed around said tup;

a roller bed support for supporting and guiding each of said first and second bands, respectively, said roller bed support comprising a plurality of change plates, each of said change plates containing heating apparatus, cooling apparatus, a plurality of rolls, and counter supports for said rolls, and being capable of being mounted to and removed from said table and said tup, each of said change plates further including a first rod mounted in a first level and connected in supporting relation with one of said rolls, at least one web plate connected to said first rod in said first level and to a connecting rod in a second level, and at least one pressure plate connected to said connecting rod in said second level whereby counter pressure from said material being pressed is transferred to said pressure plate and connecting rod.

2. The press as set forth in claim 1, wherein each of said change plates further includes an insulating plate disposed in a third level and a mounting plate disposed in a fourth level.

3. The press as set forth in claims 1 or 2, wherein said first rod and said connecting rod are each tubular in configuration.

4. The press as set forth in claim 2, wherein said pressure plate is connected to said mounting plate by a plurality of fastening screws.

5. The press as set forth in claims 1 or 4 further including a distributor plate having heating and cooling conduits connected to said heating and cooling apparatus of said change plates.

6. The press as set forth in claim 5, wherein said change plates are mounted to said press table and said tup respectively such that the web plates of two adjacent change plates are offset with respect to each other.

7. The press as set forth in claim 6, wherein each of said change plates is mounted by a plurality of tie bars under pre-stress.

8. The press as set forth in claim 7, wherein said bands, first rod, connecting rod, each web plate, each pressure plate and each distributor plate are made of a material with a high thermal conductivity.

* * * * *